United States Patent [19]

Lancaster

[11] 3,996,426
[45] Dec. 7, 1976

[54] PROTECTION CIRCUIT FOR TELEPHONE SWITCHING SYSTEM

[75] Inventor: Robert Lancaster, Brampton, Canada

[73] Assignee: Northern Electric Company Limited, Montreal, Canada

[22] Filed: Feb. 23, 1976

[21] Appl. No.: 659,996

[52] U.S. Cl. .......................... 179/84 A; 179/16 A; 179/18 FA; 179/99
[51] Int. Cl.[2] .................................. H04M 1/00
[58] Field of Search .............. 179/99, 18 FA, 18 F, 179/18 H, 18 HB, 18 AD, 81 R, 81 A, 84 R, 84 A, 16 A, 16 AA

[56] References Cited
UNITED STATES PATENTS

| | | |
|---|---|---|
| 3,529,092 | 9/1970 | Kenedi .......................... 179/18 FA |
| 3,586,785 | 6/1971 | Feiner .......................... 179/18 F |
| 3,629,514 | 12/1971 | Flamini, Jr. ........................ 179/99 |
| 3,673,339 | 6/1972 | Korn .......................... 179/18 F |
| 3,886,319 | 5/1975 | Walker .......................... 179/18 FA |

*Primary Examiner*—Thomas A. Robinson
*Attorney, Agent, or Firm*—John E. Mowle

[57] ABSTRACT

An open switching interval protection circuit for maintaining continuity on a telephone line during the switching interval of the central office equipment, in which an auxiliary battery voltage is bridged directly across the telephone line under timed control. With such an arrangement the need to break into the talking path or to tie up additional control circuitry in the central office is avoided, thereby providing high reliability at reasonable cost.

4 Claims, 2 Drawing Figures

PROTECTION CIRCUIT FOR TELEPHONE SWITCHING SYSTEM

This invention relates to an open switching interval protection circuit and more particularly to one which maintains continuity on a telephone line during the switching interval of the central office electronic switching equipment.

BACKGROUND OF THE INVENTION

In North America, telephone switching systems have been developed which use ferreed crosspoints in the switching network. In at least one such system, designated No. 1 ESS (electronic switching system), battery and ground are removed from the switching network and consequently from any associated telephone line during the switching interval in order to protect the ferreed switches. Certain station equipments at the terminal end of the telephone line contain circuits which are held operated by current supplied from the central office. As an example, a key telephone system requires a substantially continuous source of battery voltage on the telephone line in order to maintain the system in a hold condition. The break on the telephone line which results during the above-described switching interval is sufficient to disconnect the hold circuit of the key telephone system which results in some calls being lost when they are involved in network switching operations. The interval during which battery and ground are removed from the telephone line is known as the open switching interval and any system which is designed to prevent calls being lost due to this problem is referred to as open switching interval protection (OSIP). Hence, the function of an OSIP circuit is to provide battery voltage on the telephone line during the open switching interval.

Various such circuits have been proposed in the past. One arrangement uses a circuit bridged across the telephone line which is controlled by software in the electronic switching system. In this arrangement, an auxiliary source of battery and ground are bridged across the telephone line through current limiting resistors via relay contacts which are under direct control of the switching system program. For this reason the circuit control adds a "real time" load on the system program thus reducing the call carrying capacity of the machine.

In an alternate proposal, a detector circuit bridged across the output of the electronic switching system is arranged to control a relay which again connects the auxiliary source of battery voltage in shunt with the line through current limiting resistors. However, in order that the auxiliary source will not lock up its own detector circuit, so that the latter cannot sense when voltage from the switching system is restored to the telephone line, additional contacts on the relay break the telephone line between the detector circuit and the auxiliary source bridged across the telephone line. This alternate arrangement has several disadvantages. Firstly, it is necessary to cut into the telephone line to connect the break contacts of the relay in series therewith. Secondly, because the telephone line is broken by these series connected break contacts when the auxiliary source is applied to the telephone line, the station equipment is disconnected from the central office switching system during a crucial "power-cross test" which occurs on every call origination. This test is performed in order to detect the presence of a high voltage (such as 117 volts a-c from the local power company) which may become crossed to the telephone line in the environment outside the central office switching system.

STATEMENT OF THE INVENTION

It has been discovered that by bridging an auxiliary battery voltage across the telephone line under timed control the need to break into the line or to tie up additional software control in the switching system is eliminated. Thus, in accordance with the present invention there is provided an open switching interval protection circuit for a telephone switching system that is connected to station equipment via a line powered telephone line in which the line voltage from the system is removed during its switching interval. The open switching interval protection circuit, which maintains voltage on the line during the switching interval, comprises a first time control circuit which is responsive to the loss of voltage on the telephone line for connecting an auxiliary source of voltage thereto for a preset period which exceeds the switching interval. In addition, the protection circuit includes a second timed control circuit which is responsive to the first timed control circuit at the termination of the preset period for inhibiting the connection of the auxiliary source of voltage to the telephone line for a period which exceeds the time interval required to clear the station equipment on the telephone line.

Because the protection circuit itself monitors the output voltage on the line side of the switching system in order to detect the loss of voltage therefrom, it does not present a "real time" load on the software of the electronic switching system. In addition, since the auxiliary voltage source is applied under control of a timing circuit, there is no need to break the telephone line to disconnect the auxiliary source from the detector in order that the latter will not become locked up under its own control. Consequently, a malfunction of the protection circuit is not as likely to render the telephone line unserviceable. In a preferred embodiment, the protection circuit is arranged so as not to interfere with the "power-cross test" performed by the telephone switching system. If such a power-cross condition occurs on the telephone line additional detection circuitry restores the OSIP circuit to normal in the event that it is falsely triggered by the alien voltage, thus allowing the telephone switching system to detect the undesirable voltage in the normal manner.

BRIEF DESCRIPTION OF THE DRAWINGS

An example embodiment of the invention will now be described with reference to the accompanying drawings in which.

DESCRIPTION OF THE PREFERRED EMBODIMENT

Figure 1:
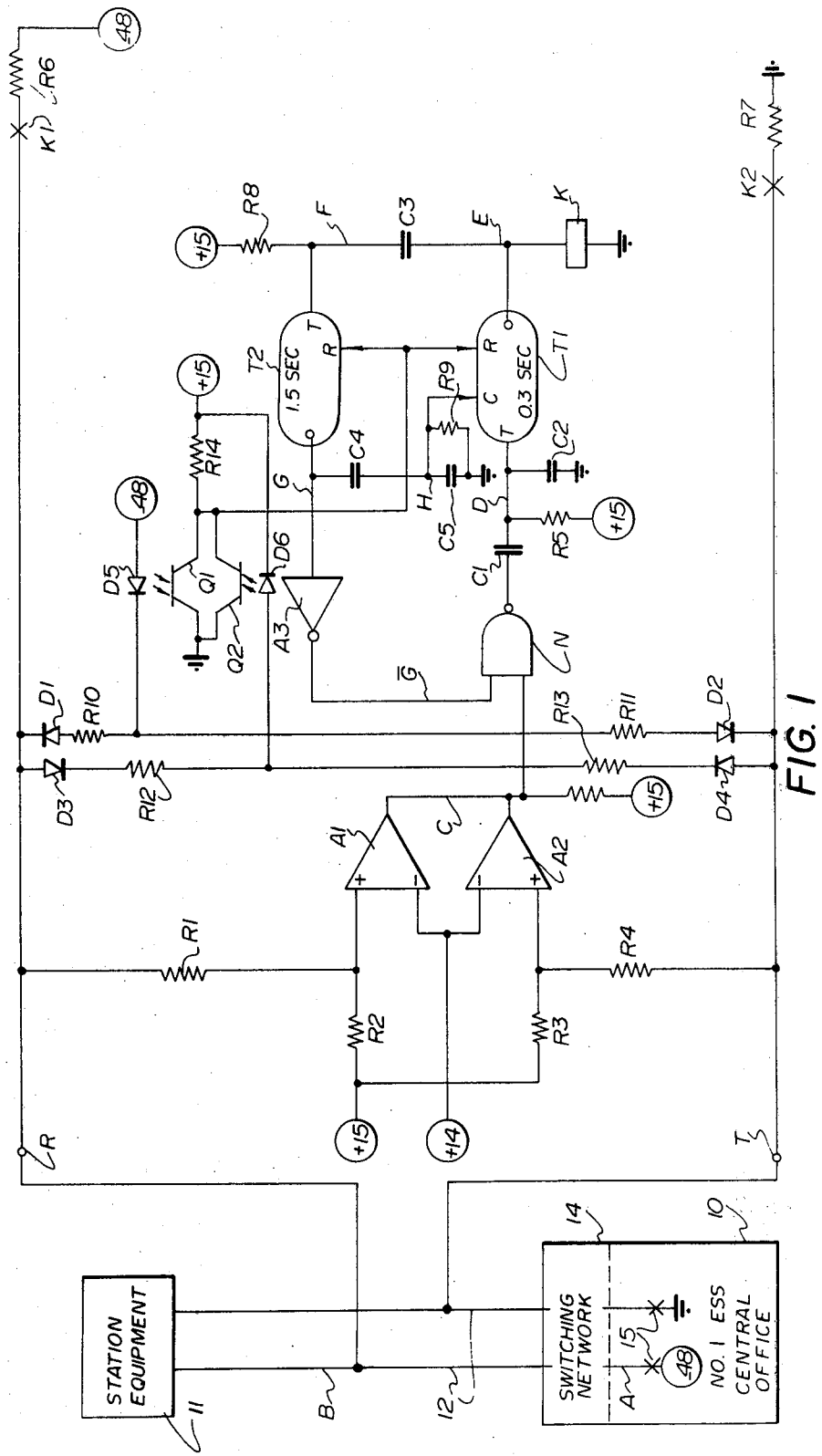
FIG. 1 illustrates a block and schematic circuit diagram of an open switching interval protection circuit in conjunction with a telephone switching system.
Figure 2:
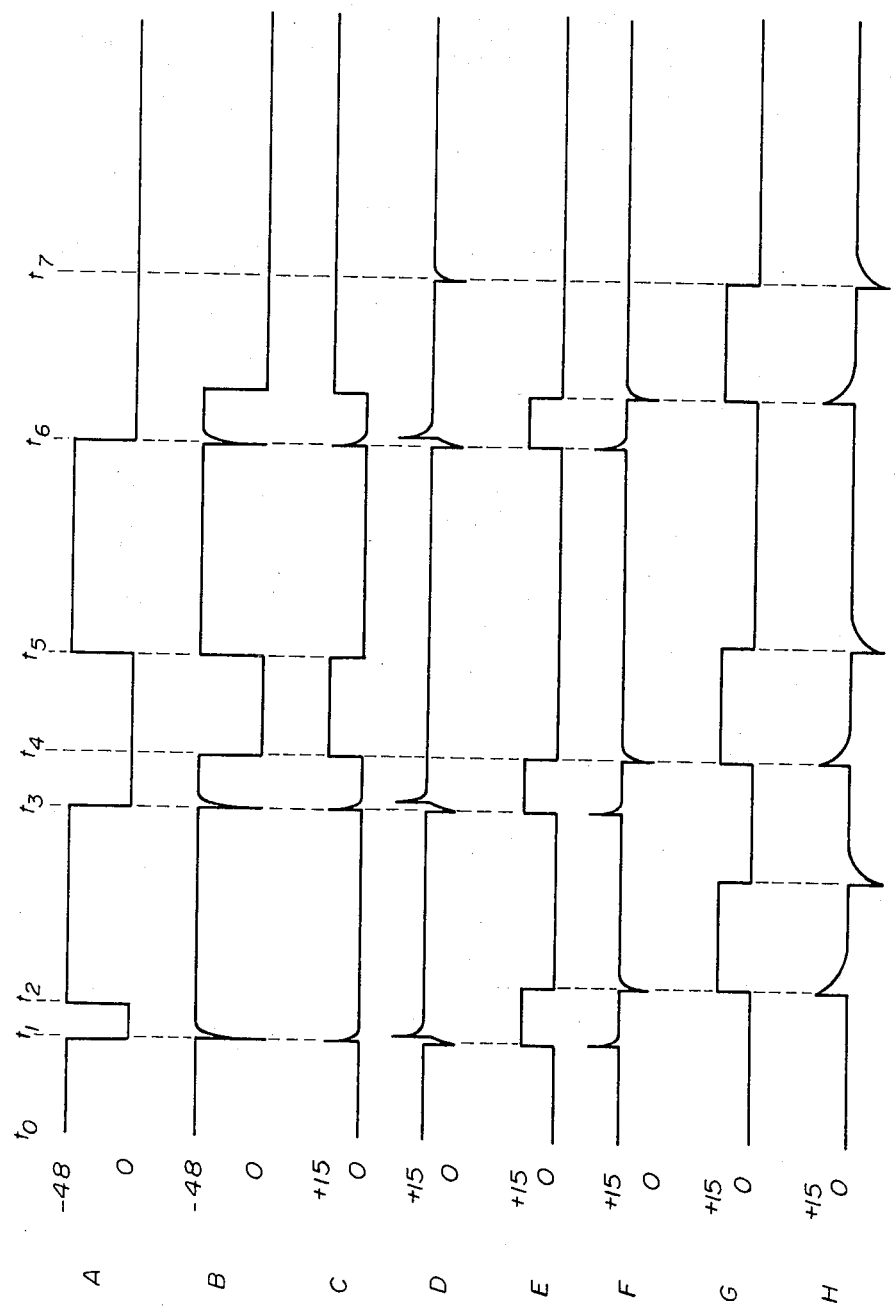
FIG. 2 illustrates typical voltage waveforms with respect to time at various points in the circuit illustrated in FIG. 1.

In FIG. 1, reference characters A to H identify the location of typical voltage waveforms identified by corresponding reference characters in FIG. 2. The waveforms in FIG. 2 are not necessarily to scale and are shown in terms of absolute magnitude.

Referring to FIG. 1, there is illustrated a central office telephone switching system 10 (such as the No. 1 ESS) connected to station equipment 11 via a line powered telephone line 12. At the central office, the telephone line 12 is connected between a −48 volt source of battery voltage and ground through the system's switching network 14. A pair of make contacts 15 which are under control of the central office equipment are exemplary of a means which may be used to disconnect the central office battery from the telephone line 12 during the switching interval of the network 14. The open switching interval protection circuit is connected between the tip and ring T-R of the line 12 with the ring connected to the −48 volt battery and the tip to ground. However, the protection circuit is designed to function when either side is connected to the −48 volt supply.

The following is a combined description of the structure and operation of the open switching interval protection circuit illustrated in FIG. 1 when taken in conjunction with the typical waveforms illustrated in FIG. 2. Voltage waveform A illustrates typical conditions encountered on the office side of the telephone line 12 upon disconnection of the central office −48 volt battery during a standard switching interval ($t_1 - t_2$), a line clearing interval ($t_3 - t_5$), and a prolonged disconnection interval ($t_6$ and on). A fourth condition, not shown in FIG. A, is encountered when a 105 volt peak a-c ringing signal is superimposed on the −48 volt supply.

With −48 volts connected to the telephone line 12 at time $t_0$, a resistive divider network comprising resistors R1, R2, R3 and R4 in conjunction with a 15 volt source applies +3 volts and +12 volts to the noninverting inputs of operational amplifiers A1 and A2 respectively. With the inverting inputs held at +14 volts, the output C is low (approximately 0 volts). Upon actuation of the contacts 15 to disconnect the −48 volt battery and ground in the central office 10 from the switching network 14, voltage B across the line 12 also drops thereby allowing the noninverting inputs to both the amplifiers A1 and A2 to rise to 15 volts as illustrated in FIG. 2 at time $t_1$.

The output voltage C then goes high (+15 volts) and is coupled to one input of a NAND gate N, the other input of which is held high at this time by the inverted signal G. The falling output of the NAND gate N is applied to a differentiation network comprising capacitors C1, C2 and resistor R5 and appears as momentary trigger signal D at the trigger input T to a first timer T1. The falling input of signal D triggers the timer T1 so as to generate at its output 0, a 300 millisecond control signal E. The control signal E in turn operates a fast-acting relay K which actuates its make contacts K1 and K2 and applies a −48 volt source of battery voltage to the ring and tip through current limiting resistors R6 and R7. This causes only a momentary spike on the line 12 as illustrated in waveform B.

The control signal E is also differentiated by capacitor C3 and resistor R8 and is applied as a second trigger signal F to the trigger input T of a second timer T2.

The 300 millisecond interval of timer T1 is selected to be slightly longer than the switching interval of the central office 10. Consequently, battery voltage is maintained on the telephone line 12 as illustrated in waveform B throughout the switching interval except for a very brief break at the beginning thereof. As a result, the station equipment 11, which is designed to ignore very short breaks, does not erroneously disconnect from the telephone line 12. At the conclusion of the timing interval from the 300 millisecond timer T1, the timer T2 is triggered by the falling signal F which produces a 1½ second control signal G at its output O. The output signal G inverted by an inverter amplifier A3 to $\overline{G}$, inhibits NAND gate N to prevent further operation of the circuit when the 300 millisecond protection interval is concluded. If battery has already been restored to the telephone line 12 from the central office 10 as illustrated at time $t_2$, the release of relay K and the opening of contacts K1 and K2 have no substantial effect on the line voltage B.

In certain instances, the station equipment 11 is erroneously maintained in an off-hook or "permanent signal" condition. In response to the detection of such a condition the central office 10 transmits a 1.5 second break as shown in A commencing at time $t_3$ in an attempt to clear the line 12. Without the timer T2, the absence of voltage on the line 12 would continually retrigger the timer T1, thereby providing a substantially continuous auxiliary voltage on the line 12 so that the station equipment 11 would not sense the clearing signal. However, since the NAND gate N is inhibited by the inverted control signal $\overline{G}$ from the timer T2, the relay K connects the −48 volt auxiliary voltage supply to the tip and ring for only the initial 300 millisecond interval, as indicated between times $t_3$ and $t_4$. Between times $t_4$ and $t_5$, timer T1 and consequently relay K are inhibited from operating and as a result the auxiliary voltage supply is not connected to the line 12 as shown in waveform B.

During a prolonged break in power from the central office 10, such as when the telephone line 12 is being repaired, shown starting at time $t_6$, the protection circuit commences to cycle as previously described. At the end of the 1½ second time interval of the timer T2, the control signal G falls, as shown at time $t_7$, which causes signal $\overline{G}$ to rise. Since at this time signal C is high, an output is obtained from the NAND gate N and appears as a falling trigger signal D at the input of the timer T1. Concurrently, control signal G is coupled through a differentiation network comprising capacitors C4, C5 and resistor R9 and appears as control input signal H at the control input C of timer T1. The time constant of this control input signal H is made longer than that of trigger input signal D so that the timer T1 is inhibited from operating. Consequently, there is no output signal at O to operate the relay K.

A fourth condition, not illustrated in FIG. 2, occurs when an a-c voltage is applied to the telephone line 12. Two conditions may cause this: the first when the 105 volt peak a-c ringing cycle is superimposed on the −48 volt supply from the central office; and the second when a-c power is inadvertently crossed to the telephone line. Under both conditions, it is desirable that the −48 volt auxiliary source be disconnected from the line 12. Therefore, if during the operation of timer T1, an a-c signal is applied to either the tip or ring, the first peak of the a-c voltage will cause one of the diodes D1, D2, D3 or D4 to conduct through resistor R10, R11, R12 or R13 causing light emitting diode D5 or D6 to actuate during that portion of the cycle when the voltage is either more negative than −48 volts or more positive than +15 volts. This in turn causes photosensitive transistor Q1 or Q2 to conduct through resistor R14, which transmits a reset pulse to input R of both timers T1 and T2. The forced resetting of timer T1 opens relay K thereby disconnecting the auxiliary source of voltage from the telephone line 12.

With the tip side of the line 12 connected to ground, the voltage at the noninverting input of amplifier A2 cannot rise above +12 volts. This effectively prevents the output signal C from going high so that NAND gate N cannot operate. Consequently, the auxiliary source of voltage either disconnects from the telephone line 12 or remains so, whenever a ringing signal is connected to the telephone line 12.

In the event of an a-c power-cross to either side of the line, reset signal R from Q1 and Q2 spans the negative and positive peaks of the a-c voltage. In this manner the relay contacts are prevented from making or breaking current at peaks of the a-c voltage cycle.

What is claimed is:

1. In a telephone switching system connected to station equipment via a line powered telephone line in which the line voltage from the switching system is removed during its switching interval; an open switching interval protection circuit, for maintaining voltage on the line during said switching interval, comprising:
    a line monitor for generating a momentary trigger signal in response to the loss of voltage on said line;
    a first timer responsive to said trigger signal for generating a first control signal for a period which exceeds the switching interval;
    a control means responsive to said first control signal for connecting a source of voltage to said telephone line;
    a second timer responsive to the termination of said first control signal for generating a second control signal which exceeds the time interval required to clear the station equipment on the telephone line;
    means responsive to the second control signal for inhibiting the first control signal at the output of the first timer; and
    means responsive to the second control signal for inhibiting the trigger signal at the output of the line monitor;
    whereby the auxiliary source is applied to the telephone line for a period sufficient to maintain continuity in the station equipment only during an initial switching interval.

2. An open switching interval protection circuit as defined in claim 1 which additionally comprises:
    an additional line monitor for generating a third control signal in response to a voltage on the line which exceeds said line voltage; and
    means responsive to the third control signal for resetting said timers to inhibit the first and second control signals at the outputs thereof.

3. An open switching interval protection circuit for a telephone switching system that is connected to station equipment via a line powered telephone line in which the line voltage from the system is removed during its switching interval; said open switching interval protection circuit maintaining voltage on the line during said switching interval and comprising:
    first timed control means responsive to loss of voltage on said telephone line for connecting a source of voltage thereto for a period which exceeds the switching interval; and
    second timed control means responsive to the first timed control means at the termination of said period for inhibiting the connection of said source of voltage to said telephone line for a period which exceeds the time interval required to clear the station equipment on the telephone line.

4. An open switching interval protection circuit as defined in claim 3 which additionally includes:
    means responsive to a voltage on the telephone line which exceeds said line voltage for inhibiting the connection of said auxiliary source of voltage to said line.

* * * * *